March 10, 1959     I. H. SHAFFER     2,877,023

AXLE MOUNTING FOR TRAILERS

Filed Aug. 20, 1956     3 Sheets-Sheet 1

INVENTOR.
Ivan H. Shaffer
BY
Parker & Frochner
Attorneys.

March 10, 1959  I. H. SHAFFER  2,877,023
AXLE MOUNTING FOR TRAILERS
Filed Aug. 20, 1956  3 Sheets-Sheet 2

INVENTOR.
Ivan H. Shaffer
BY
Attorneys.

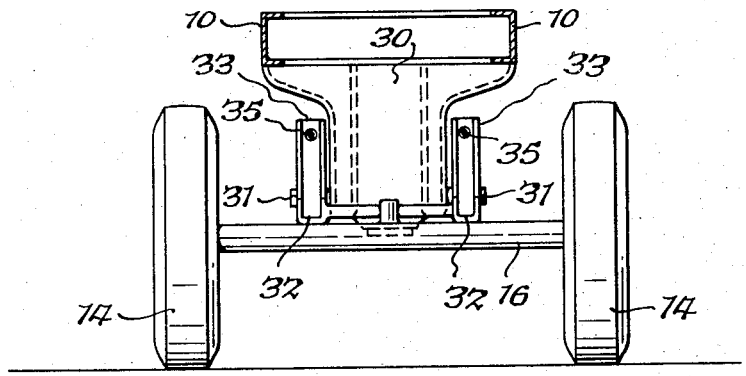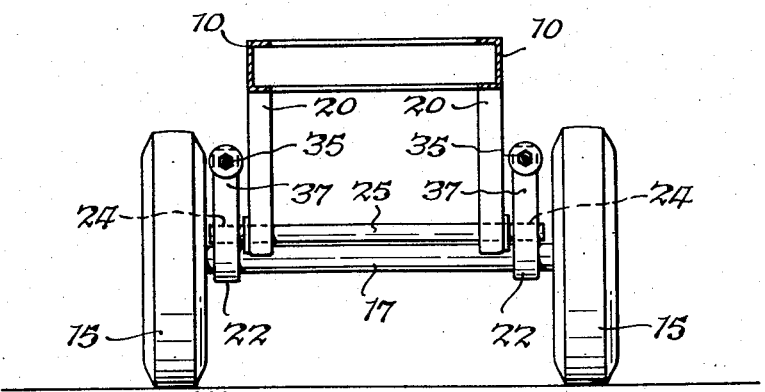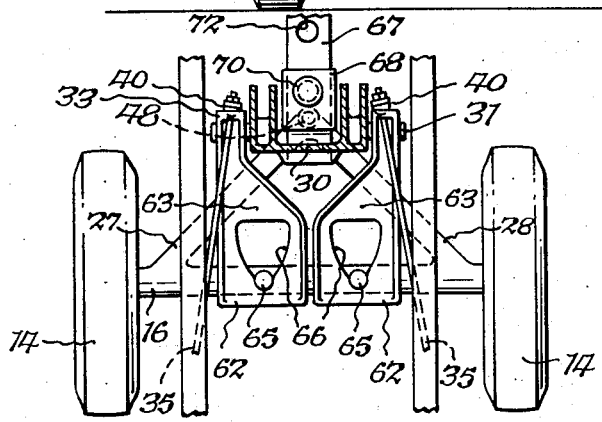

United States Patent Office 2,877,023
Patented Mar. 10, 1959

2,877,023

AXLE MOUNTING FOR TRAILERS

Ivan H. Shaffer, Buffalo, N. Y.

Application August 20, 1956, Serial No. 605,128

14 Claims. (Cl. 280—104.5)

This invention relates to trailers of the kind designed for carrying heavy loads and which are provided with twin or tandem axles in place of the usual single axle, and more particularly this invention relates to trailers in which one of the twin axles is mounted to shift or turn to facilitate pulling the trailer around curves.

It is an object of this invention to provide trailers of this kind with a mounting of improved construction for the shiftable axle whereby the distance between the axles is varied so that the shiftable axle is spaced further from the first axle when adjusted for travel on roads and closer to the fixed axle when backing or otherwise maneuvering the trailer in close quarters.

It is also an object of this invention to provide a trailer of this type with an improved spring suspension which facilitates the ready adjustment of one axle relatively to the other.

A further object is to provide a construction by means of which the movable axle may be shifted on a lever for the purpose of placing different portions of the weight of the trailer on the movable axle. Still another object is to facilitate the moving of the trailer around turns by decreasing the load on one of the axles, so that this axle can more readily be skidded or slid on a pavement or other supporting surface.

Figure 2:
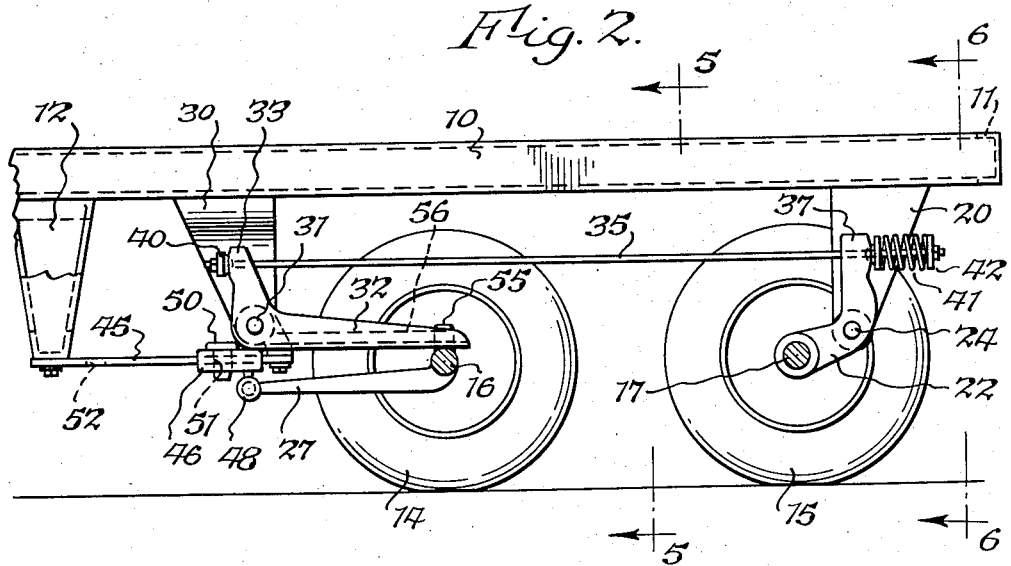
Fig. 2 is a longitudinal sectional elevation thereof on line 2—2 of Fig. 1.

Figs. 5 and 6 are transverse sectional elevations thereof on lines 5—5 and 6—6 respectively of Fig. 2.

Fig. 7 is a fragmentary top plan view of an axle mounting of modified construction.

The body or frame of the trailer may be of any suitable or desired construction, that shown being provided with a rectangular frame constructed of beams of U-shaped cross section, including a pair of longitudinally extending beams 10, a transversely extending beam 11 suitably secured to the longitudinal beams. The two longitudinal beams are also connected by a transversely extending frame member or bracket 12, a portion of which extends downwardly. 14 and 15 represents the front and rear wheels of the twin axles of the trailer, the wheels 14 being suitably journaled on an axle 16 and the rear wheels being journaled on an axle 17. The axle 17 may be supported on the lower portions of the wheel supporting brackets 20 which are secured to and extend downwardly from the side members 10. The axle 17 is, however, not mounted directly on the brackets 20 but on a pair of bellcrank levers 22 which are fulcrumed on pivots 24 on the downwardly extending bearing brackets 20. The pivots 24 are, in the construction shown, being formed on the ends of a bar or shaft 25 which extends crosswise of the chassis and is secured to the lower ends of the two brackets 20.

The axle 16 of the other wheels 14 is provided with a draw bar which may be in the form of a rigid forwardly extending V-shaped bracket rigidly secured to the axle and comprising two angularly disposed arms 27 and 28 each welded or crosswise secured to each other at their front ends and diverging rearwardly and having their rear ends welded or otherwise secured. The axle 16 is connected through intermediate means with a bracket member 30, the upper part of which is rigidly secured to the side frame member 10. The lower portion of this bracket 30 is provided with bearings or pivots 31 on which two bell-crank levers are pivoted. These bellcrank levers have lower substantially horizontally extending arms 32 which rest on the axle 16. These bellcrank levers also have upwardly extending arms 33.

The spring mounting of the part of the trailer supported on the twin axles is affected through the bell-crank levers on which the axles 16 and 17 are supported and for this purpose a rod 35 is provided which extends through holes formed in the upwardly extending arms 33 of the levers on which the axle 16 rests and through upwardly extending arms 37 of the levers 22. Two of these rods 35 are provided, one on each side of the trailer, and these rods are each provided at one end thereof with a part 40 which has a limited universal joint connection, such as a partly spherical surface which cooperates with a socket formed in the front face of the upwardly extending arm 33. At the other ends of these rods 35 springs 41 are provided, which are interposed between disks or washers 42 secured on the ends of the rods 35 and the rear faces of the upwardly extending arms 37 of the levers 22. By means of this construction it will be noted that the levers are free to move relatively to the rods 35, and these rods distribute the load placed upon the wheels in such a manner that if an excessive load is placed on one of the wheels 14, for example as would happen if this wheel rode over a bump or obstruction, the wheel through the axle 16 would urge the nearest rod 35 to the left in the construction shown in Figs. 1 to 4. Consequently at the other end of the rod this pull is exerted against the upwardly extending arm 37 of the corresponding lever 22. This would result in the swinging of the lever 22 in a direction to press the wheel 15 downwardly which would thus transfer to the wheel 15 some of the load to which the other wheel 14 would otherwise be subjected. The springs 41 also act to absorb the road shocks which are generally absorbed by leaf springs in trailers of constructions heretofore commonly employed.

Figure 1:
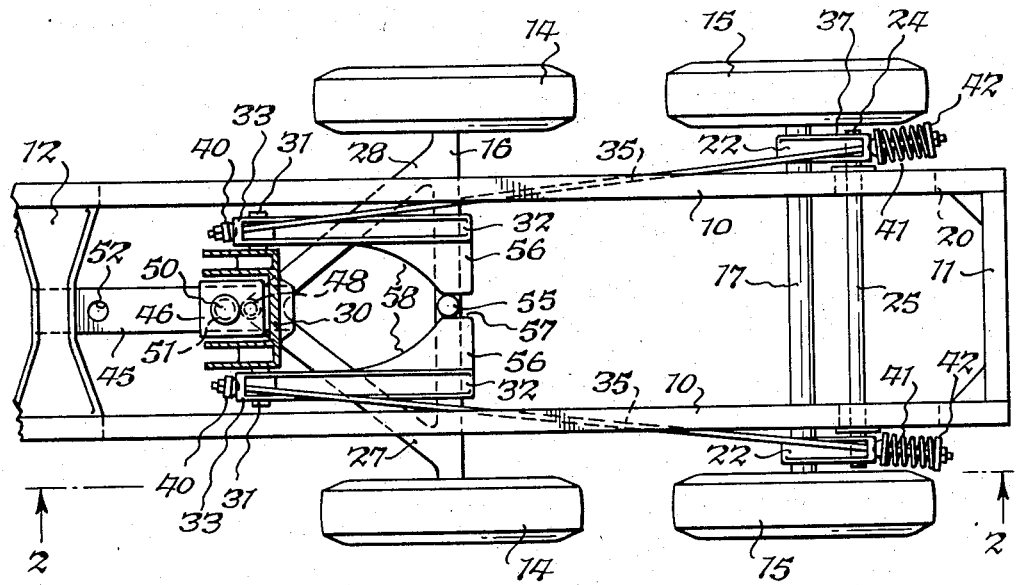
Fig. 1 is a top plan view of the rear portion of a trailer chassis provided with twin axles mounted according to an embodiment of this invention.
Figure 3:
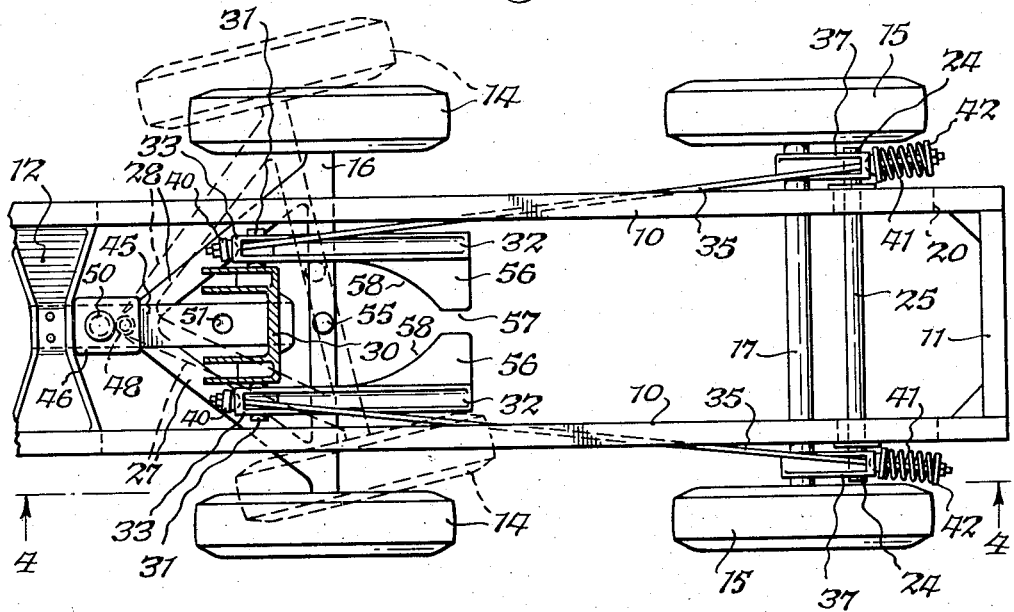
Fig. 3 is a top plan view thereof similar to Fig. 1 except that the movable axle has been placed into a position in which it is free to swing about an upright axis.
Figure 4:
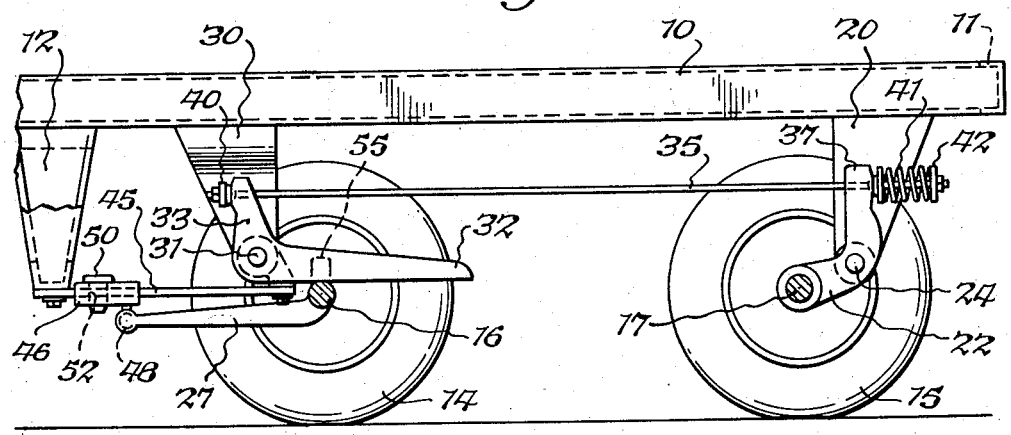
Fig. 4 is a sectional elevation thereof on line 4—4 of Fig. 3.

The downwardly extending brackets 12 and 30 are connected at the lower ends by means of a rigid connecting or guide member 45, and a slide 46 is mounted to slide lengthwise on this connecting member. The front end of the bars 27 and 28 of the draw bar are pivotedly connected to this slide 46 through a universal joint such for example as a ball and socket joint 48 so as to permit the axle 16 to readily move up and down as well as to swing laterally and into inclined positions. This slide 46 preferably extends about the connecting member 45 and may be locked either in a rear position, as shown in Figs. 1 and 2, or in a forward position, as shown in Figs. 3 and 4, and any suitable means may be employed to hold the slide in either position. In the construction shown, by way of example, a pin 50 is provided which extends through vertically alined holes in the upper and lower faces of the slide 46, and may pass through a hole 51 in the connecting member 45 when the slide is in the rear position, as shown in Figs. 1 and 2, or through a hole 52 when the slide is in its forward position.

The reason for moving the axle 16 and the parts connected therewith rearwardly and forwardly relatively to the trailer is that when in its rear position the axle 16 and wheels 14 mounted thereon are held against turning, in which position the axle will be secured against turning when the trailer is being moved into a position which requires sharp turns. When the axle is shifted to its forward position, it is free to turn, for example when the trailer is traveling forwardly on streets or roads.

Any suitable or desired means may be provided for controlling the position of the axle 16, and this is preferably done by cooperation of the axle with the lever arms 32. In the construction shown, by way of example, this axle is provided with an upwardly extending pin or stud 55 rigidly secured thereto, and the lever arms 32 are provided with horizontally extending webs or projections 56 which extend toward each other and are spaced apart to form a slot 57 into which the upwardly extending pin or stud 55 may enter when the axle is moved into its rear position. These webs or projections are provided with curved inner edges 58 which converge toward the slot 57 and consequently when the axle 16 is in its forward position, as shown in Figs. 3 and 4, the upwardly projecting pin or stud 55 may move laterally about its ball and socket joint connection 48 within the space provided between the two webs 56 of the lever arms 32.

The shifting of the slide 46 and the axle 16 and parts connected therewith may be effected by moving the trailer when the pin 50 is removed from a hole in the connecting member. If, for example, the axle 16 is in the position shown in Fig. 1 and it is desired to move this axle forwardly to facilitate turning of the trailer, the pin 50 is removed, whereupon the trailer is backed up, which will cause the axle 16 and the parts connected therewith to remain substantially stationary while the slide 46 moves forwardly relatively to the connecting member 45, whereupon the pin 50 may be replaced to extend through the hole 52. During this movement the brakes of the trailer wheels are preferably applied so that the wheels 14 will remain in approximately fixed positions while the power unit will force the trailer to move rearwardly. The pin 55 will, of course, move out of the slot 57, as shown in Fig. 3, so that the axle 16 will be free to swing about the universal joint 48. When it is desired to move the slide and axle back, the opposite procedure of course is followed, in which the converging edges of the webs 56 will guide the pin or stud into the slot 57.

Fig. 3 shows clearly the action of the axle 16 when the trailer passes around a curve on a street or highway. For example, if the front end of the trailer is swung to the left, which is downwardly in Fig. 3, the wheels 14 resting on the road or other surface will, of course, tend to remain in the position shown in full lines in Fig. 3, but the movement of the trailer and ball and socket joint 48 will swing the axle toward or into the dotted line position in which the wheels will, of course, take positions at an angle to the length of the trailer. The lever arms 32 are spaced far apart to permit the axle 16 to swing as far as necessary.

When it is desired to reset the axle 16 into position for backing or otherwise maneuvering the trailer into position for loading or unloading, the trailer is moved forwardly by its power unit, preferably while the brakes are applied at least to a limited extent, and after the pin 50 has been removed. In this case the curved edges 58 of the lever arms 32 will guide the stud 55 back into the slot 57, whereupon the pin 50 may be dropped into position in the hole 51 of the connecting member 45. It will be noted by comparing Figs. 1 and 2 with Figs. 3 and 4 that the wheels 14 will then be considerably closer to the wheels 15 so that if the trailer body is turned there will be considerably less work to be done to cause the wheels 14 to slide or skid on the ground relatively to the wheels 15, also the wheels 14, being nearer to the wheels 15, will slide or skid a shorter distance than when the wheels are farther apart as in Figs. 3 and 4. Furthermore, it will be noted that in the rear position of the wheels 14, the axle 16 will be supported near by the rear ends of the lever arms 32. Consequently the axle 16 will act upon the levers with materially greater leverage than when in the positions shown in Figs. 3 and 4. This in turn results in swinging the lever arms 32 upwardly to a greater extent by the weight of the trailer than when the axle 16 is in the forward position shown in Figs. 3 and 4 with the result that the rods 35 will be moved forwardly due to this greater leverage thus placing a greater share of the load on the rear wheels 15. Consequently, this in turn will require less power to slide or skid the wheels 14 sideways and less wear and abrasion on the tires.

The construction described has the further advantage that when the wheels are spaced in positions for travel on the highways as shown in Figs. 3 and 4, they are sufficiently far apart to comply with the load distribution requirements of the various State governments.

In the modified construction shown in Fig. 7, the lever arms 32 are replaced by lever arms 62 having larger webs or lateral projections 63 than the lever arms 32 shown in Figs. 1 to 6.

The axle 16 is provided with two upwardly extending pins or studs 65 and each of the webs 63 is provided with openings 66 therein, the edges of which converge toward the rear ends thereof and form slots or spaces within which the studs 65 are confined when the axle 16 is moved to its rearward position for use in backing the trailer or moving it through sharp turns while parking. The connecting member 67 in this case is shorter than the one shown in Fig. 6 and a slide 68 is movable lengthwise of the connecting member when the pin 70 thereof is moved upwardly out of one or the other hole in the connection member. Fig. 7 shows the parts in position when the axle is in its rear position for use in parking and backing the trailer and when the axle and parts mounted thereon are moved forwardly so that the pin 70 engages the hole 72 in the connecting member, the studs 65 will be in the wider portions of the openings 66 in the webs or projections 63 of the lever arms. In this position the axle 16 may turn when the trailer moves forwardly over a street or highway so that no skidding or sliding of the wheels will result.

The operation of this mechanism is the same as that disclosed in the other figures and will be readily understood.

In both of the two constructions disclosed, the springs which support the weight of the truck body and its contents on the axles and wheels through the levers permit freedom of movement of the axles 16 and wheels 14 for turning, since the axle 16 can slide lengthwise along the lever arms 32 or 62. This makes it possible for the wheels 14 and axle 16 to change their positions relatively to the trailer body.

The arrangement described has the further advantage that when the trailer is moving around a curve on the road the greater part of the load will be subjected to the wheels on the outside of the curve; and as clearly shown in Fig. 3 the axle 16, as shown in broken lines, has moved along the lever arm 32 nearer to the outside of the curve and into position closer to the pivot of this lever. This means that the spring 41 will exert greater pressure on the lever arm 32 on the outside of the curve and the part of the axle bearing on the lever arm 32 on the inside of the curve will have less pressure applied to it by its spring 41. In other words the construction described opposes the tendency of the trailer to tip over when moving around a curve, both due to the fact that the wheels 14 are nearer to the outside of the curve than they are when travelling along a straight part of the highway, and since the axle and the outside lever arm resting on it offer greater resistance to leaning or tipping of the trailer toward the outside of the curve.

I claim:

1. A trailer having a frame, a pair of axles having wheels mounted thereon and mounted on said trailer, one in advance of the other, levers pivoted on said frame intermediate of their ends at opposite edges of said frame and each having a substantially horizontally extending arm supported on an axle and a substantially upright arm, resilient means acting on said upright arms of said levers to oppose the swinging of the same about the pivotal connections with said frame, the horizontally extending arms of some of said levers having a slidable connection with one of said axles, a draw bar for said last mentioned axle pivotally connected with said frame, means for connecting said draw bar in different positions fore and aft of said trailer, and means connected with said axle for holding said axle against swinging relative to its horizontally extending arms when said draw bar is in one position and releasing said axle to permit swinging of same when said draw bar is in another position.

2. A trailer having a frame, a pair of axles having wheels mounted thereon and mounted on said trailer, one in advance of the other, levers pivoted on said frame intermediate of their ends at opposite edges of said frame and each having a substantially horizontally extending arm supported on an axle and a substantially upright arm, resilient means acting on said upright arms of said levers to oppose the swinging of the same about the pivotal connections with said frame, the horizontally extending arms of some of said levers having a slidable connection with one of said axles, a draw bar for said last mentioned axle pivotally connected with said frame, means for connecting said draw bar in different positions fore and aft of said trailer, and cooperating parts on said axle and said horizontally extending arms of said lever for restricting the swinging of said axle when said draw bar is on one position and for permitting swinging of said axle relatively to said horizontally extending arms when said draw bar is in another position.

3. A trailer according to claim 2 in which said axle has an upwardly extending stud and in which said substantially horizontally extending arms have a slot into which said stud may enter when said draw bar is arranged in one position, to hold said axle against swinging.

4. A trailer according to claim 2 in which said axle has an upwardly extending stud and in which said substantially horizontally extending arms have a slot into which said stud may enter when said draw bar is arranged in one position, to hold said axle against swinging, said horizontally extending arms having portions diverging from said slot which permit said axle to swing into different angular positions relatively to said trailer when said draw bar is secured in a position in which said stud is out of said slot.

5. A trailer having a frame, a pair of axles having wheels mounted thereon and mounted on said trailer, one in advance of the other, levers pivoted on opposite sides of said frame intermediate of their ends and each having a substantially horizontally extending arm supported on an axle and a substantially upright arm, resilient means acting on said upright arms of said levers to oppose the swinging of the same about the pivotal connections with said frame, the horizontally extending arms of some of said levers having a slidable connection with one of said axles, a draw bar for said last mentioned axle pivotally connected with said frame, a guide bar secured to said frame and extending lengthwise thereof, means for connecting said draw bar in different positions on said guide bar, and cooperating parts on said trailer and said last mentioned axle for preventing swinging of said axle when said draw bar is connected in one relation to said guide bar and for permitting swinging of said axle when said draw bar is connected in another relation to said guide bar.

6. A trailer according to claim 5 and including a slide movable lengthwise of said guide bar, and a universal joint connection between said drawbar and said slide.

7. A trailer having a frame and a pair of axles having wheels mounted thereon and arranged in tandem with reference to said frame, levers pivoted on opposite sides of said frame intermediate of their ends and each having a substantially horizontally extending arm and a substantially upright arm, two of said levers having one of said axles journaled near the outer ends of said horizontally extending arms, the other levers cooperating with said other axle having surfaces extending lengthwise of the vehicle along their horizontally extending arms on which said other axle may slide, and a draw bar secured to said other axle and pivoted on said trailer, whereby said other axle when swinging about said pivotal connection of its draw bar with said trailer will move along the horizontally extending portions of its levers.

8. A trailer according to claim 7 in which means are provided for positioning said pivotal connection of said drawbar in different positions lengthwise of said trailer while said other axle moves along said horizontally extending portions of its levers.

9. A trailer according to claim 7 in which means are provided for positioning said pivotal connection of said draw bar in different positions lengthwise of said trailer while said other axle moves along said horizontally extending portions of its levers and means for locking said other axle against turning when said drawbar is in one of its positions.

10. A trailer having a frame and a pair of axles having wheels mounted thereon and arranged in tandem with reference to said frame, levers pivoted on the sides of said frame intermediate of their ends and each having a substantially horizontally extending arm and a substantially upright arm, two of said levers having the rear axle journalled thereon near the outer ends of said horizontally extending arms, the other levers cooperating with the front axle having surfaces extending lengthwise of the vehicle along their horizontally extending arms on which the front axle may slide, a drawbar secured to said front axle and extending forwardly therefrom and pivotally connected with said vehicle, means for securing the front end of said drawbar in a forward and a rearward position relatively to said vehicle, and means for locking said front axle against swinging when said drawbar is in its rearward position, whereby said front and rear axle will be in close proximity to each other when said front axle is held against swinging and will be spaced farther from said rear axle when said front axle is free to swing about the pivotal connection of said drawbar with said vehicle.

11. A trailer according to claim 10 and including a guide bar extending lengthwise of and fixed to said trailer, a slide movable lengthwise of said guide bar and to which said drawbar is pivotally connected, and means for locking said slide in different positions relatively to said guide bar.

12. A trailer according to claim 10 in which the means for locking said front axle against swinging include studs extending upwardly from said front axle and in which each of said levers for the front axle has laterally extending webs on its horizontally extending arms provided with openings into which said studs extend, said openings terminating in slots at their rear ends into which said studs extend to hold said front axle against swinging when said drawbar is in a rear position, said openings having parts of greater width into which said studs extend when said drawbar is in a forward position to permit said front axle to swing.

13. A trailer according to claim 1, in which said axle when said draw bar is in said first mentioned position, is positioned a greater distance from the pivotal connection of said levers with the frame to provide less downward pressure on the axle when said trailer is moving rearwardly.

14. A trailer having a frame, a pair of axles having wheels mounted thereon, one in advance of the other, a pair of levers for each axle, said levers being pivoted intermediate of their ends on the sides of said frame and each having a substantially horizontally extending arm and a substantially upwardly extending arm, said horizontally extending arms being supported by said axles in spaced relation to the transverse middle portions of said axles, a rod connecting the upwardly extending arms at one side of the middle portions of said axles, another rod connecting the upwardly extending arms at the other side of the middle portions of said axles, resilient means interposed between at least one upwardly extending arm and its rod for yieldingly opposing the swinging of said levers about their pivotal connections with said frame, one of said axles being slidable relatively to the horizontal portions of its levers into different angular relations thereto to facilitate the turning of said trailer around curves, and means operable at will for holding said slidable axle against sliding relatively to its levers when said axle has been moved rearwardly relatively to said levers.

References Cited in the file of this patent

UNITED STATES PATENTS

| | | |
|---|---|---|
| 1,427,240 | Stanfield | Aug. 29, 1922 |
| 1,894,776 | Liang | Jan. 17, 1933 |
| 2,135,291 | Pinard | Nov. 1, 1938 |
| 2,227,448 | Freeman | Jan. 7, 1941 |
| 2,361,166 | Ayers | Oct. 24, 1944 |
| 2,717,707 | Martin | Sept. 13, 1955 |